(12) United States Patent
Weber et al.

(10) Patent No.: US 9,225,226 B2
(45) Date of Patent: Dec. 29, 2015

(54) ELECTRIC MACHINE HAVING A HOUSING SECURED BY PLASTICALLY DEFORMED CENTERING PINS

(71) Applicant: Robert Bosch GmbH, Stuttgart (DE)

(72) Inventors: Matthias Weber, Baden-Baden (DE); Jing Xu, Shanghai (CN); Beiwen Lu, Shanghai (CN); Jun Xu, Shanghai (CN); Shibin Cui, Shanghai (CN); Thomas Holzer, Karlsbad (DE); Yong Liu, Reutlingen (DE); Peter Steuer, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 346 days.

(21) Appl. No.: 13/786,655

(22) Filed: Mar. 6, 2013

(65) Prior Publication Data

US 2013/0234567 A1    Sep. 12, 2013

(30) Foreign Application Priority Data

Mar. 7, 2012  (CN) .......................... 2012 1 0058558
Mar. 14, 2012  (DE) ......................... 10 2012 203 946

(51) Int. Cl.
*H02K 5/22* (2006.01)
*H02K 11/00* (2006.01)
*H02K 15/00* (2006.01)

(52) U.S. Cl.
CPC ............ *H02K 11/0084* (2013.01); *H02K 15/00* (2013.01); *Y10T 29/49009* (2015.01)

(58) Field of Classification Search
CPC ...... H02K 11/0084; H02K 5/22; H02K 5/225
USPC ...................................... 310/68 D, 71, 89, 91
See application file for complete search history.

(56) References Cited

U.S. PATENT DOCUMENTS

| | | | |
|---|---|---|---|
| 4,773,829 A * | 9/1988 | Vettori | 310/68 R |
| 2007/0204954 A1* | 9/2007 | Brunnecker et al. | 156/272.8 |
| 2008/0308759 A1* | 12/2008 | Narita et al. | 251/129.15 |
| 2009/0121578 A1* | 5/2009 | Benkert | 310/239 |
| 2009/0324435 A1* | 12/2009 | Sears et al. | 310/215 |
| 2012/0139371 A1* | 6/2012 | Gottschalk et al. | 310/71 |

FOREIGN PATENT DOCUMENTS

| | | | | |
|---|---|---|---|---|
| DE | 102005016128 | | 10/2006 | |
| DE | 102005000160 | | 5/2007 | |
| DE | 102009027610 | | 1/2011 | |
| DE | 102009027610 A1 * | 1/2011 | ............. | E05F 15/16 |

OTHER PUBLICATIONS

Machine translation of DE 102009027610 A1 (Jan. 2011).*

* cited by examiner

*Primary Examiner* — Michael Andrews
(74) *Attorney, Agent, or Firm* — Michael Best & Friedrich LLP

(57) ABSTRACT

An electric machine (10), in particular for the motorized adjustment of movable parts in the motor vehicle, and method for producing an electric machine (10), comprising a housing part (16) in which a printed circuit board (20) for electrically activating the electric machine (10) is arranged, wherein at least one centering pin (44) which reaches into a centering opening (45) in the printed circuit board (20) is arranged in the housing part (16), wherein the centering pin (44) is plastically deformed at the free end (46) thereof in order to form a securing head (56).

15 Claims, 7 Drawing Sheets

ELECTRIC MACHINE HAVING A HOUSING SECURED BY PLASTICALLY DEFORMED CENTERING PINS

BACKGROUND OF THE INVENTION

The invention is based on an electric machine, and on a method for producing the electric machine.

An adjusting drive with an electric motor, in which a printed circuit board is fitted into the housing of the adjusting drive, has been disclosed by DE 10 2009 027 610 A1. The housing contains a plurality of retaining pins, onto which the printed circuit board is pushed during the installation thereof. In this case, the printed circuit board has corresponding centering openings in which the retaining pins engage. The retaining pins have a stop against which the printed circuit board bears with respect to installation in the joining direction. In this case, the printed circuit board can be clipped in in order to fix the latter in the housing.

However, it is disadvantageous in this embodiment of the retaining pins that additional latching elements have to be integrally formed in order to fix the printed circuit board, said latching elements reliably spatially fixing the printed circuit board. Such a fixing is necessary, for example, in order to contact the printed circuit board electrically by means of soldering. In addition, the cover of the housing for surrounding the printed circuit board also has to be secured by means of additional connecting means against removal counter to the joining direction.

SUMMARY OF THE INVENTION

By contrast, the electric machine according to the invention, and the method according to the invention for producing such a machine, have the advantage that, in addition to correctly positioning the printed circuit board in the housing, the centering pin is also used at the same time for fastening the printed circuit board in the housing of the machine. For this purpose, after installation of the printed circuit board, the free end of the centering pin is plastically deformed such that a securing head is formed at the end of the centering pin. Said securing head prevents the printed circuit board from deviating back counter to the joining direction after said printed circuit board has been installed.

Advantageous developments and improvements of the features are possible by means of the measures cited. It is particularly advantageous to form the at least one centering pin in one process step with the manufacturing of the housing part. For this purpose, the centering pin and the housing part are manufactured from plastic such that the free end of the centering pin can simply be thermally deformed during the process. For this purpose, for example, a hot punch can be pressed against the free end of the centering pin or the centering pin can be deformed by means of ultrasonic welding. As an alternative, the centering pin could be manufactured separately from the housing part and subsequently inserted into the housing part in a precise position. For example, the centering pin could be formed as part of a brush holder which is fastened in a defined position in the housing part or protrudes in a defined manner into the housing part.

It is particularly favorable if a stop against which the printed circuit board bears after the fitting thereof in the joining direction, is formed on the centering pin and/or on the housing on a side opposite the free end of the centering pin. This enables the printed circuit board to be very exactly positioned by pressing against the stop running transversely with respect to the joining direction.

The plastic deformation of the free end results in the formation thereon of a securing head which has a larger diameter than the central region of the centering pin. As a result, the printed circuit board and/or the housing cover are/is held reliably in the ready assembled position. If the centering pin is of cylindrical design, the free end can advantageously be deformed into a circular securing head which can uniformly absorb the forces counter to the joining direction.

If the printed circuit board is pressed against the stop by the integrally formed securing head, the printed circuit board is thereby fixedly fixed spatially, as a result of which, for example, an automatic mechanical soldering process for the electric connections of the printed circuit board is also made possible. For this purpose, positioning elements are arranged, for example, on the housing part—in particular adjustment holes integrally formed in the housing part—which interact with a corresponding positioning device of the soldering machine. In particular, two or three adjustment holes for the soldering machine are formed for this purpose in the housing part. If the centering pin and the adjustment holes are directly formed integrally with the housing part, the tolerance chain for the soldering of the electric contacts is particularly small, and the soldered joints are thus formed more reliably.

If the securing head is integrally formed at the free end directly adjacent to the printed circuit board, said securing head is formed with a larger diameter than that of the centering receptacle of the printed circuit board. In this case, the securing head presses the printed circuit board against the stop, thus fixedly fixing the printed circuit board spatially.

In addition to the centering openings, the printed circuit board preferably has contact bores for receiving electric contact pins. The latter may be in the form of press-in pins which, with the pushing onto the centering pins, are pressed into the corresponding contact bores in a self-clamping manner. Furthermore, what are referred to as soldering pins can be fitted into corresponding contact bores and are subsequently soldered to the printed circuit board.

The installed printed circuit board advantageously extends along the rotor shaft of the electric machine, wherein the centering pins are oriented transversely with respect to the rotor shaft in order to receive the printed circuit board. By means of this arrangement of the printed circuit board, it is possible to arrange, for example, a magnetic sensor—in particular a Hall sensor—which detects the rotational position of the rotational speed of the rotor shaft on said printed circuit board. Other electronic components for the electric power supply and/or for the specific activation of the electric motor may also be fastened on the printed circuit board. A microprocessor is preferably arranged on the printed circuit board, said microprocessor, for example, also evaluating the rotational speed signal and making it possible to provide position detection and/or an anti-pinch function for the adjustment drive.

If the securing head is integrally formed directly on the outside of the housing cover, the latter is formed with a larger diameter than the housing opening for the centering pin. As a result, said plastic deformation of the free end of the centering pin constitutes a type of "seal", and therefore the housing cover cannot be opened unnoticeably, since an opening of the housing cover causes destruction of the securing head, said destruction being easily detectable.

It is advantageous if the securing head is integrally formed in a depression on the outside of the housing cover, since the securing head then does not protrude over the outer circumferential surface of the housing cover. As a result, the securing head is protected against destruction, and the electric machine can have a very flat construction. Said machine can therefore be installed, for example, even in flat construction spaces, such as a side door or a roof of the vehicle.

By the housing cover being fixed in the joining direction, the printed circuit board can be pressed in the joining direction against the stop by means of an extension, which is arranged on the housing cover, in the joining direction. With the fixing of the housing cover, the printed circuit board can therefore also be reliably fixed in a single installation process. By means of the plastic deformation of the free end, both the housing cover and the printed circuit board can be pressed against the housing base in a displacement-proof manner in the joining direction in a single working step.

For the reliable fixing of the printed circuit board and/or of the housing cover only in the joining direction, exactly one centering pin may already be adequate. If, in addition, exact positioning is also intended to be achieved in the plane transversely with respect to the printed circuit board and/or with respect to the housing cover, the arrangement of exactly two or exactly three centering pins is advantageous, said centering pins in particular being oriented approximately parallel to one another.

The electric machine is preferably in the form of an electric motor which is part of a gearbox drive unit. In this case, the electric motor is arranged on a gearbox housing in which a gearbox which is driven by the rotor shaft of the electric motor is mounted. The printed circuit board is arranged in a particularly space-saving manner within the gearbox housing which at the same time takes on the function of the electronic housing for the printed circuit board.

In the case of the method according to the invention for producing the electric machine, the free end of a centering pin is preferably deformed to form a securing head after the printed circuit board has been pushed onto the centering pins by means of centering openings. As a result, the centering pin takes on the function of the spatial positioning and at the same time the fixed fixing of the printed circuit board.

It is particularly advantageous if the free end of the centering pin has a curved or conical or pointed shape before the deformation thereof. As a result, the centering pin is easily inserted into the centering opening and the free end can advantageously be deformed by means of hot stamping to form a securing head which has a larger diameter than the central part of the centering pin.

It is advantageous if the free end is deformed in such a manner that the integrally formed securing head bears in the joining direction directly against the printed circuit board and presses the latter against the stop. As a result, the printed circuit board can be reliably fastened to the housing by means of the deformed centering pins so that the electric connection by soldering pins can be undertaken by means of an automatic soldering process.

In an alternative method, after the printed circuit board is installed onto the centering pins, the housing cover is pushed with the housing bores onto the centering pins, and only then are the free ends plastically deformed. As a result, the housing cover and the printed circuit board are simultaneously secured at least in the joining direction against displacement. The printed circuit board and the housing cover are mounted in the joining direction—in particular approximately radially with respect to the rotor shaft. The extent of the housing cover is therefore approximately at least the same size as the extent of the printed circuit board and completely covers the latter when the housing is closed.

If the printed circuit board has contact bores for receiving press-in pins, the printed circuit board can be precentered upon fitting of the centering pins into the centering openings. Said precentering enables the press-in pins to find the corresponding contact opening thereof in the printed circuit board. The press-in pins are of conical design, and therefore the printed circuit board is finely adjusted by means of the interference fit of the press-in pins in the contact bores. This method permits in particular simple manual installation of the printed circuit board onto the centering pins with very great positioning accuracy of the printed circuit board in the housing because of the fine centering by means of the press-in pins.

In this case, in particular after the press-in pins have been pressed in, the centering pin does not bear against the wall of the centering opening, since, for the fine centering by means of the interference fit, there has to be adequate play between the centering pin and the centering opening.

With the method according to the invention, the printed circuit board and/or the housing cover can advantageously be pressed with a predefined installation force against the stop as long as the securing head is integrally formed at the free end. The position of the printed circuit board with respect to the rotor shaft can therefore be manufactured very precisely, since, after the plastic deformation of the free end, the securing head holds the printed circuit board and/or the housing cover at an exact distance from the rotor shaft by means of a prestressing force.

The free end of the centering pin is advantageously deformed according to the invention by means of hot stamping. In this case, the material of the free end is heated, as a result of which said material can be plastically deformed. The hot stamping can be undertaken, for example, by means of a hot stamping punch which is pressed in the joining direction onto the free end. The deformed end is then preferably actively cooled in order to obtain a smooth surface for the securing head and a clean release of the stamping punch. For this method, the centering pin is advantageously manufactured from plastic which can simply be plastically deformed at relatively low temperatures.

BRIEF DESCRIPTION OF THE DRAWINGS

Embodiments of the invention are illustrated in the drawings and explained in more detail in the description below.

DETAILED DESCRIPTION

Figure 1:
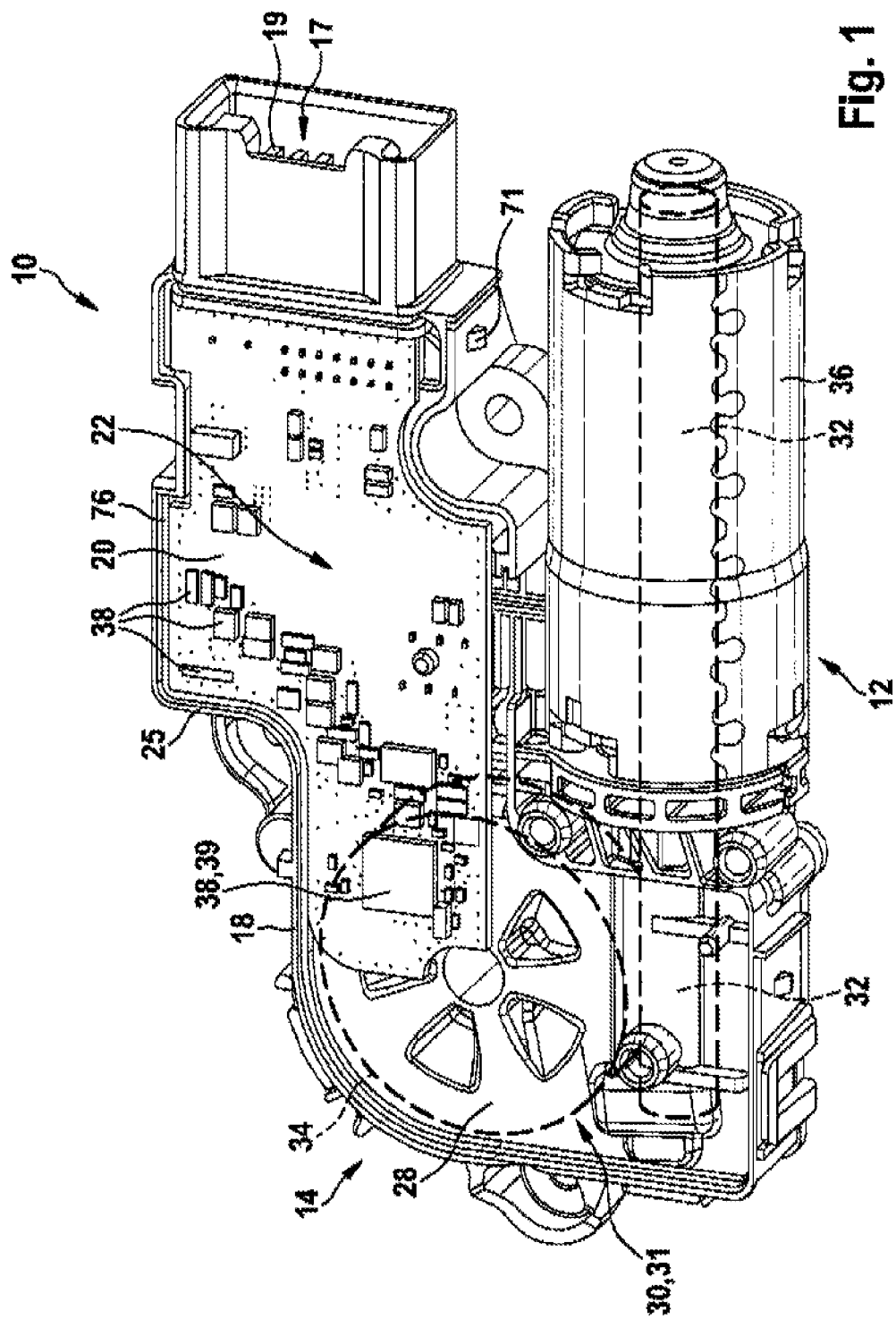
FIG. 1 shows a first exemplary embodiment of a gearbox drive unit according to the invention

FIG. 1 illustrates an electric machine 10 according to the invention in the form of an electric motor 12. The electric motor 12 is, for example, part of a gearbox drive unit 14, as used for adjusting a sliding roof. Similar adjustment drives which have an electric machine 10 according to the invention are in the form of a window opening drive or seat drive or in the form of a servo drive for further movable parts in the motor vehicle. The gearbox drive unit 14 has, as the electric machine 10, an electric motor 12 with an electronic unit 22 which is arranged in a housing part 16 of the housing 18 of the electric machine 10. The housing part 16 is in the form of an electronic housing 25 which is an integral part of a gearbox housing 28, in which a gearbox 30 is arranged. The gearbox 30 is in the form of, for example, a worm gearing 31, in which a worm 33 arranged on a rotor shaft 32 of the electric motor 12 meshes with a worm wheel 34 mounted in the gearbox housing 28. The driving torque of the electric motor 12 is transmitted by the worm wheel 34 to an output element (not illustrated specifically) which, for example, drives the part to be adjusted—in particular in the motor vehicle. In the exemplary embodiment, the electric motor 12 has a stator 36 which is flange-mounted onto the gearbox housing 28, wherein the rotor shaft 32 protrudes into the gearbox housing 28. The stator 36 is produced, for example, from metal and serves as a magnetic back-circuit for the magnets arranged in the stator 36. In the exemplary embodiment, the housing part 16 is produced from plastic, in particular by means of injection molding. The housing part 16 has a connector element 17 in which the contact connections 19 for the electric and electronic power supply are arranged. FIG. 1 illustrates the housing part 16 open without a housing cover 26, wherein a printed circuit board 20 on which a plurality of electronic components 38 are arranged is already fitted in the housing part 16. An electronic component 38 is in the form of a microprocessor 39 which serves to activate the electric motor 12 and/or to evaluate a rotational position signal of the rotor shaft 32. For this purpose, a rotational position sensor 40 which interacts with a signal transmitter 41 arranged on the rotor shaft 32 can be arranged on the printed circuit board 20. The rotational position sensor may be designed, for example, as a Hall sensor which detects a magnetic signal from a sensor magnet arranged on the rotor shaft 32 or on a gearwheel 34. In particular, a position detection of the actuator and/or an anti-pinch function for the gearbox drive unit 14 can thereby be realized. The printed circuit board 20 is in the form of a printed circuit board (PCB) in which electrically conducting strip conductors are positioned onto an electrically insulating carrier material. By means of the carrier material which is, for example, a plastic, the printed circuit board 20 is designed to be stiff and rigid per se and immovable.

Figure 2:
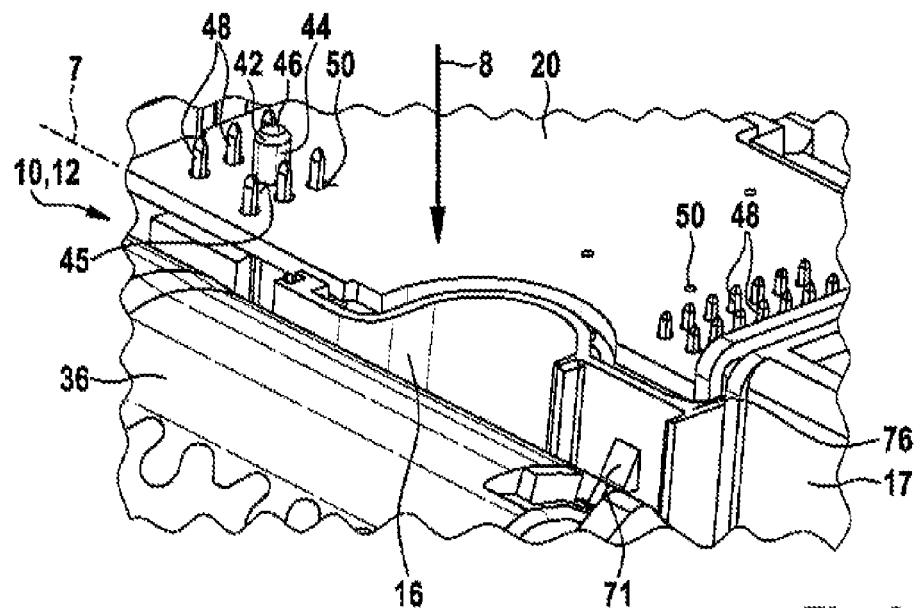
FIG. 2 shows an enlarged detail of FIG. 1
Figure 3:
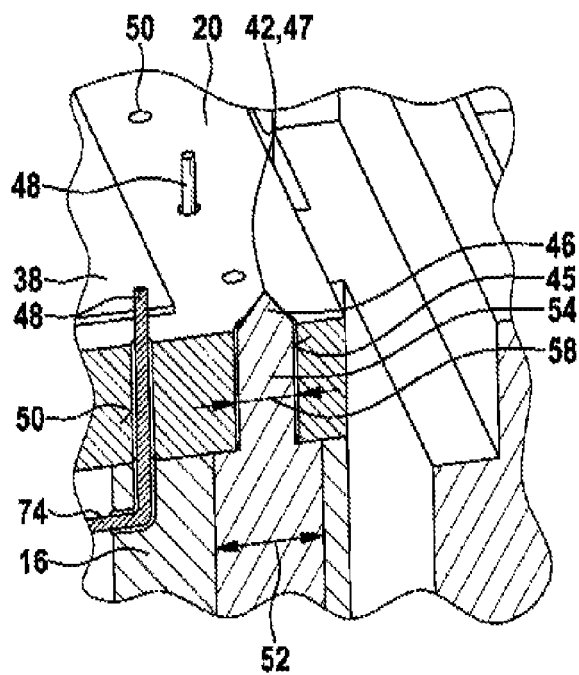
FIG. 3 shows a further exemplary embodiment of a centering pin according to the invention before the plastic deformation thereof
Figure 4:
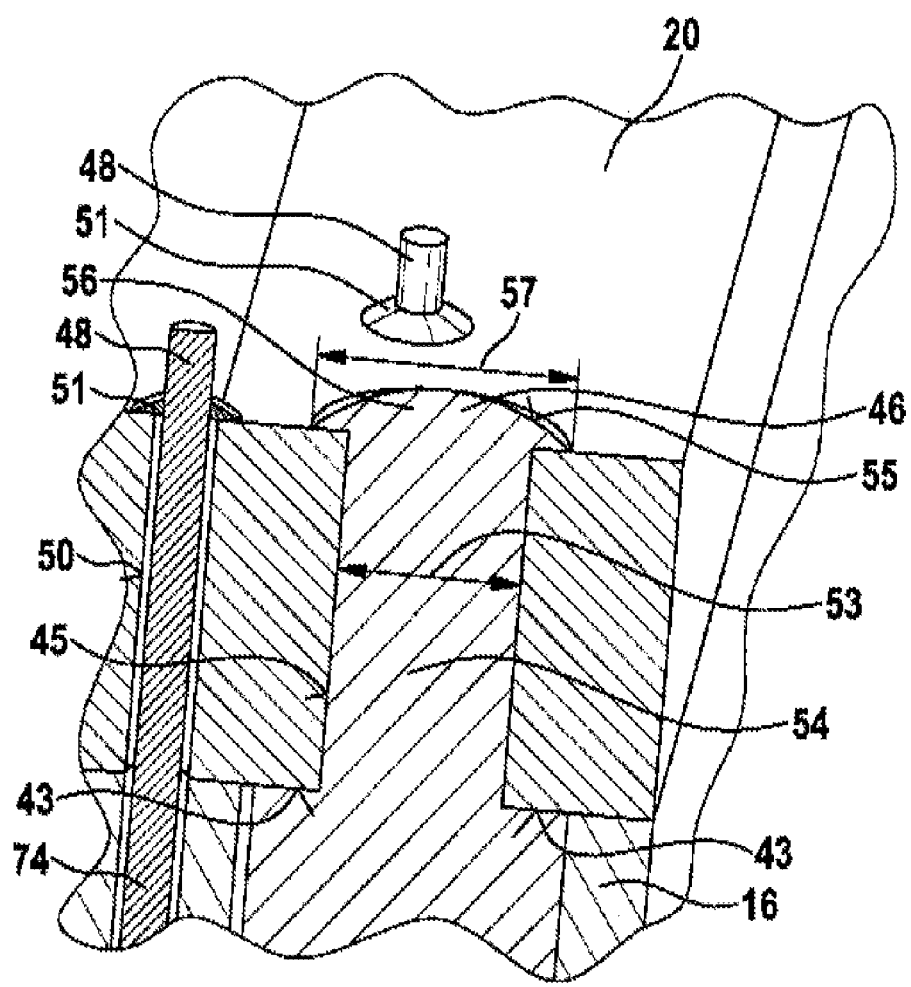
FIG. 4 shows a further exemplary embodiment of a centering pin according to the invention after the plastic deformation thereof
Figure 7:
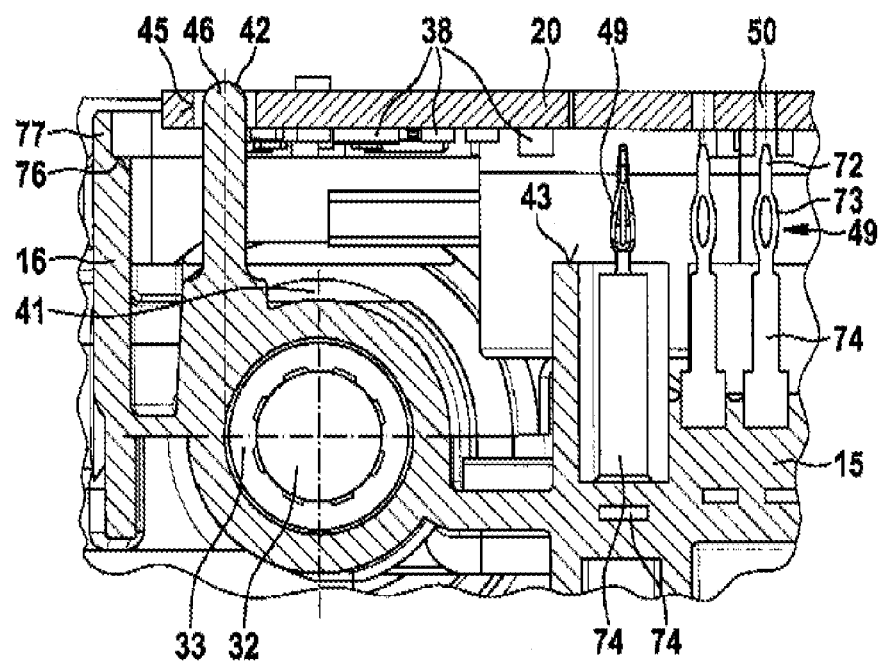
FIGS. 7 to 9 show a further exemplary embodiment of the invention with illustration of the various method steps.

As can better be seen in the detailed view according to FIG. 2, a centering pin 44 which engages in a centering opening 45 in the printed circuit board 20 is arranged in the housing part 16. The centering pin 44 is formed integrally here with the housing part 16 and is produced, for example, by means of injection molding. The centering pin 44 is preferably composed of plastic and has a free end 46. For easy finding of the centering opening 45, the free end 46 here has a phase on the surface 42 of the free end 46. Alternatively, the surface 42 of the free end 46 can also be of pointed or curved design, as illustrated in FIG. 3 or FIG. 7. The centering pin 44 is preferably of cylindrical design, wherein the free end 46 has a cone. The centering pin 44 is, for example, oriented radially with respect to the rotor shaft 32 such that the printed circuit board 20, during the installation thereof in the joining direction 8, is oriented transversely with respect to the centering pin 44 and pushed onto the centering pin 44. The printed circuit board 20 can have approximately a rectangular contour or any other contour and, in the fitted state, extends along the rotor shaft 32. Upon "threading" of the centering pin 44 into the centering opening 45, the printed circuit board 20 is exactly adjusted in the housing part 16 in the plane 7 transversely with respect to the joining direction 8. As a result, the soldering pins 48 arranged in the housing part 16 and/or the press-in pins 49 also find their corresponding contact bores 50 in the printed circuit board 20. The soldering pins 48 illustrated on the right side in FIG. 2 produce the electric connection to the contact connections 19 of the connector element 17. The soldering pins 48 in the vicinity of the centering pin 44 form electric connections for supplying current to the electric motor 12 and/or to the rotational position sensor 40 which can also be arranged directly in the housing part 16.

FIG. 3 shows a section through the printed circuit board 20 of a further exemplary embodiment, in which the free end 46 of the centering pin 44 has a point 47. On that side of the centering pin 44 which is opposite the free end 46, said centering pin has a step 43 against which the printed circuit board 20 bears in the joining direction 8. The step 43 is in the form of, for example, a circular ring-shaped collar which has a larger outside diameter 52 than the outside diameter 53 of the centering pin 44 in the central region 54 thereof. The contact openings 50 for the soldering pins 48 and press-in pins 49 are formed in the printed circuit board 20 approximately parallel to the centering opening 45. The soldering pins 48 illustrated are fastened, for example, in the housing part 16 and can be inserted or pressed or injected as inserts in the housing part.

After the printed circuit board 20 is pushed onto the centering pins 44, the free end 46 is plastically deformed. This results in a securing head 56 which has a larger diameter 57 than the diameter 58 of the centering opening 45 and than the diameter 53 of the central region 54 of the centering pin 44. The securing head 56 has a curved surface 55 which has been deformed, for example, by means of hot calking The securing head 56 presses the printed circuit board 20 in the joining direction 8 against the stop 43 as a result of which the printed circuit board 20 is fixedly fixed spatially. If there is a plurality of centering pins 44 which engage in corresponding openings 45, rotation of the printed circuit board 20 in the plane 7 transversely with respect to the joining direction 8 is also prevented. After the printed circuit board 20 is fixed in the housing part 16, the soldering pins 48 can be mechanically soldered such that the latter are electrically connected by means of soldered joints 51 to the contact openings 50 in the printed circuit board 20.

Figure 5:
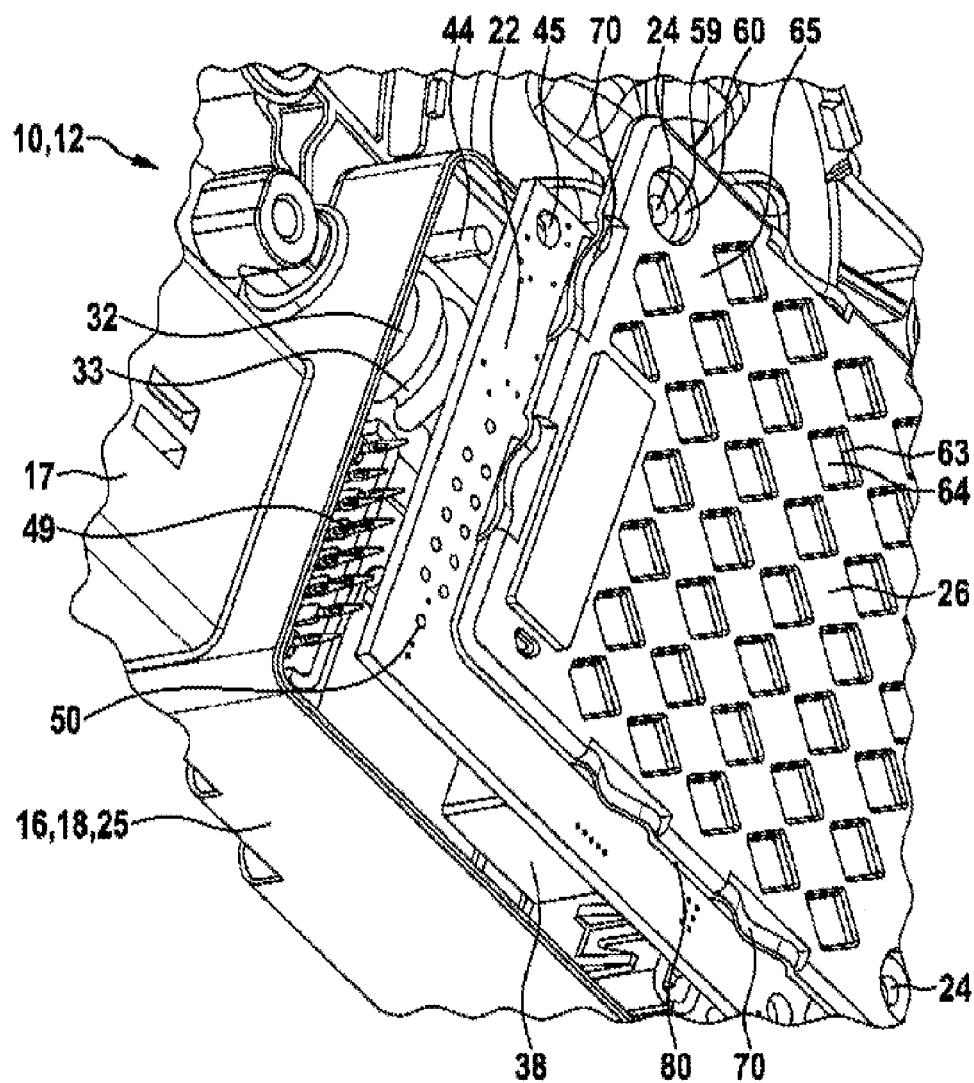
FIGS. 5 and 6 show a further exemplary embodiment in an exploded illustration and with the housing cover closed.

FIG. 5 illustrates an electric machine 10 in which the housing part 16 is closed by means of a housing cover 26. Both the printed circuit board 20 and the housing cover 26 are of approximately rectangular design, wherein the housing cover 26 covers the entire printed circuit board 20. As a result, the printed circuit board 20 can be mounted radially with respect to the rotor shaft 32 in the joining direction 8 into the housing part 16, wherein the centering opening 45 of the printed circuit board 20 is joined onto the centering pin 44. As a result, the contact openings 50 in the printed circuit board 20 are also positioned in relation to the press-in pins 49 which are arranged in the housing part 16. With the fitting of the printed circuit board 20, an electrically conducting clamping connection is provided between the press-in pins 49 and the contact openings 50. The press-in pins 49 are formed, for example, integrally with the contact connections 19 of the connector element 17 and in particular are pressed or injected into the housing part 16. The electronic components 38 are arranged on that side of the printed circuit board 20 which faces the rotor shaft 32, and therefore the printed circuit board 20, on the side facing the housing cover 26, is formed relatively flat along the plane 7. After the installation of the printed circuit board 20, the housing cover 26 is mounted in the joining direction 8, wherein the centering pin 44 reaches through a housing opening 24 of the housing cover 26. The housing cover 26 is likewise configured to be relatively flat along the plane 7, wherein a rhomboidal structure is formed on the large flat cover surface for stabilization thereof, as a result of which the material of the housing cover 26 is arranged virtually in two different planes 61, 62 which are connected to each other in the joining direction 8 via the circumferential walls 63 of the individual rhombi 64. The housing openings 24 are arranged in depressions 60 of the housing cover 26, the border 59 of which depression lies at a lower level than the outer surface 65 of the housing cover 26.

Figure 6:
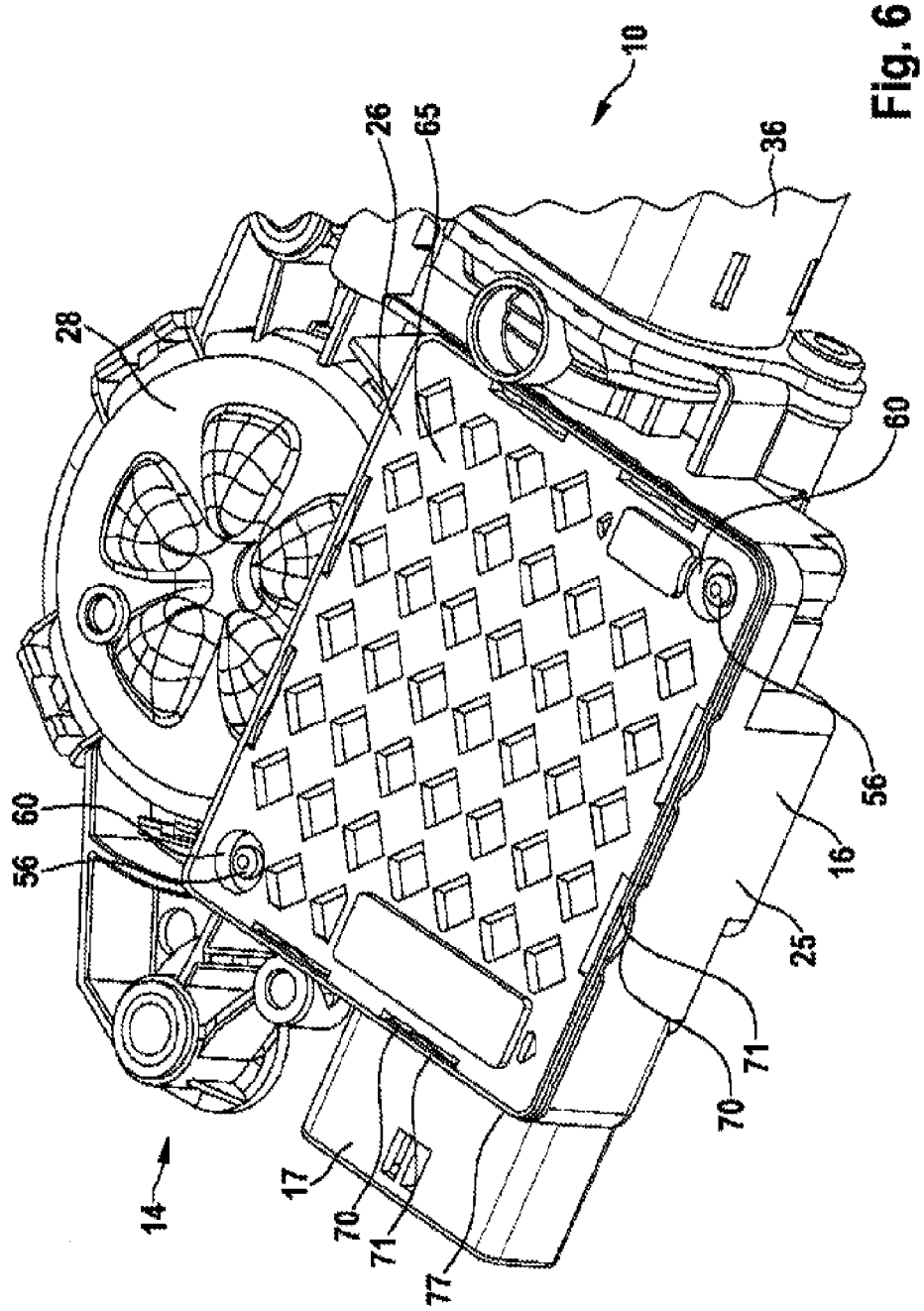

After the housing cover 26 is installed in the joining direction 8, the free ends 46 of the centering pins 44 are plastically deformed to form securing heads 56, as illustrated in FIG. 6. In this embodiment, the securing heads 56 are arranged within the depressions 60, and therefore said securing heads do not protrude over the outer surface 65 of the housing cover 25. The diameter 57 of the securing heads 56 is larger than the diameter 23 of the housing opening 24 and larger than the diameter 53 of the central region 54 of the centering pin 44. The housing cover 26 has latching elements 70 which engage in mating latching elements 71 on the housing part 16. In this solution, the press-on force 78 of the housing cover 26 in the joining direction 8 is applied by the latching of the latching elements 70 to the mating latching elements 71 such that the securing heads 56 are relieved of load. The securing heads 56 virtually form a form-fitting seal for the housing part 16, and therefore the housing cover 26 cannot be removed from the housing part 16 without being destroyed. An unauthorized opening of the housing part 16 or a manipulation of the electronic unit 22 arranged therein is therefore prevented. In the exemplary embodiment, there are exactly two centering pins 44. The latter are preferably positioned in diametrically opposite corners of the housing cover 26. The latching elements 70 and mating latching elements 71 are in particular arranged in such a manner that they do not protrude over the outer surface 65 of the housing cover 26.

In one variation, the housing cover 26 bears against an outer edge 76 of the housing part 16 in the joining direction 8 and is guided by a circumferential wall 77 of the housing part 16. In this embodiment, the housing cover 26 does not have to be exactly guided by means of the centering pin 44, since the circumferential wall 77 and the latching elements 70 with the mating latching elements 71 take over the fine positioning function.

FIGS. 7 to 9 once again illustrate the installation steps of the production method according to the invention. At least one centering pin 44 onto which the printed circuit board 20 is pushed in the joining direction 8 by the centering opening 45 is arranged in the housing part 16. During the fitting of the printed circuit board 20, the press-in pins 49 and/or the soldering pins 48 are introduced into contact openings 50 in the printed circuit board 20 for the electric contact connection. The housing cover 26 is then pushed in the joining direction 8 onto the centering pin 44 by the housing openings 24. Subsequently, the free end 46 of the centering pin 44 is plastically deformed. In this case, a securing head 56 which has a larger diameter 57 than the diameter 23 of the housing opening 24 is formed.

In FIG. 7, the free end 46 has a curved surface 42 in order to guide the printed circuit board 20 on the centering pin 44 and to preadjust the printed circuit board 20 in relation to the housing part 16. It is apparent in FIG. 7 that the centering pin 44 has a certain play in relation to the centering opening 45. In this case, the contact openings 50 are preadjusted in relation to the press-in pins 49 in such a manner that the conical points 72 of the press-in pins 49 penetrate the contact openings 50 and exactly adjust the printed circuit board 20 in the housing part 16 by the formation of a clamping connection. For this purpose, the press-in pins 49 have a resilient eye 73 which is placed resiliently in a centering manner onto the circumferential wall of the contact openings 50. The press-in pins 49 are arranged on electric strip conductors 74 which are injected in the housing base 15. The printed circuit board 20 is fitted in the joining direction 8 radially with respect to the rotor shaft 32 until the latter bears against a stop 43 on the housing part 16. A rotational position sensor 40 which interacts with a signal transmitter 41 on the rotor shaft 32 is fastened to the printed circuit board 20 on the side thereof which faces the rotor shaft 32. By means of the bearing 43 of the printed circuit board 20 against the stop 43, the rotational position sensor 40 is exactly positioned in relation to the signal transmitter 41.

Figure 8:
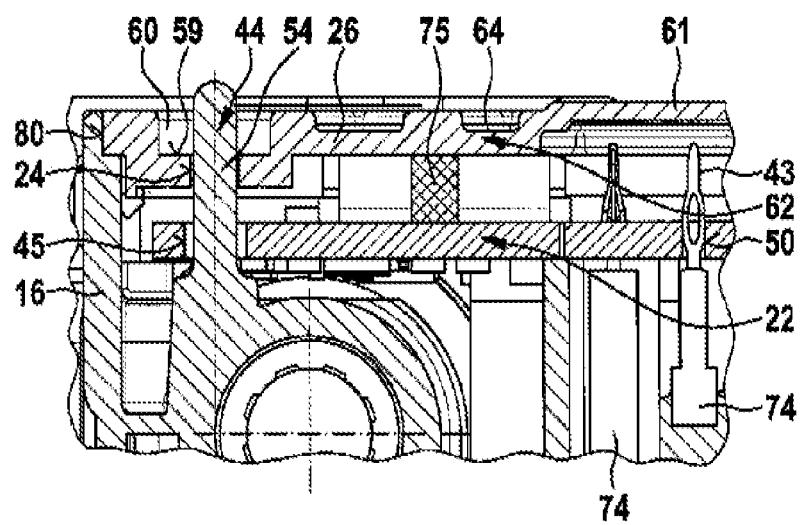
Figure 9:
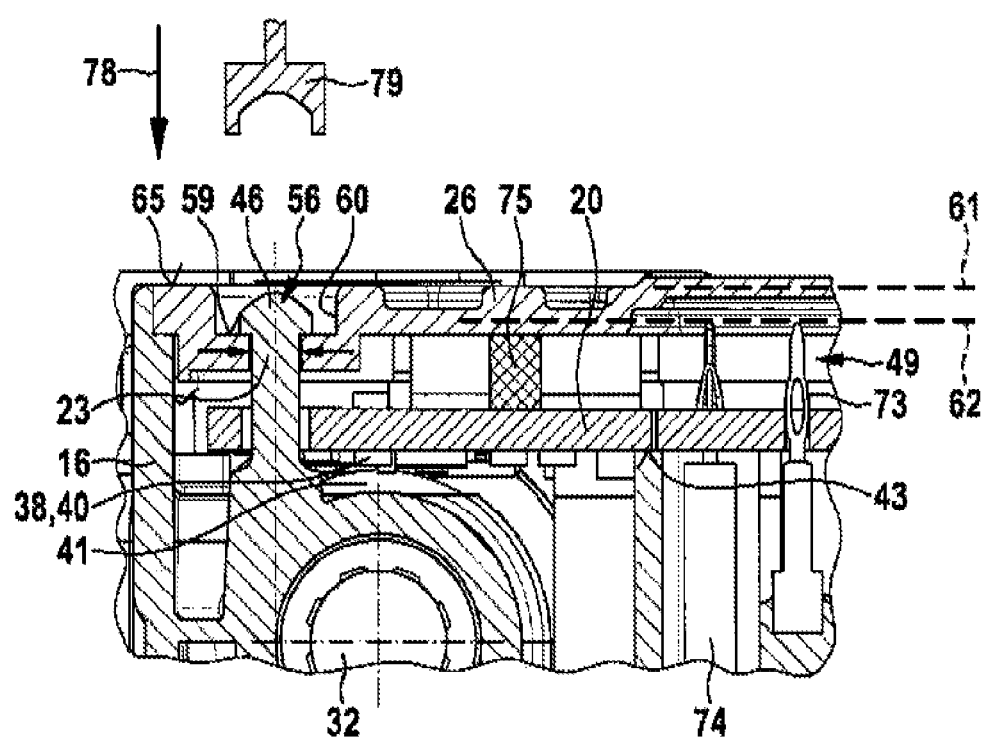

The housing cover 26 in FIG. 8 is then pushed onto the centering pin 44 and the printed circuit board 20 is pressed by an extension 75 of the housing cover 26 against the stop 43. The free end 46 is then deformed by means of hot stamping so as to form a securing head 56 which bears directly in the joining direction 8 against the outside of the housing cover 26. As a result, the housing cover 26 is pressed both via the extension 75 and the printed circuit board 20 in the joining direction 8 against the stop 43. During the hot stamping, the housing cover 26 and/or the printed circuit board 20 are/is pressed with a defined press-on force 78 against the housing base 15 until the securing head 56 has sufficiently cooled. The press-on force 78 can be applied by a stamping punch 79 which thermally deforms the free end 46.

It should be noted that, with regard to the exemplary embodiments shown in the figures and in the description, diverse possibilities of combining the individual features among one another are possible. For example, the electric machine 10 may also be formed without a gearbox 30 or with a gearbox form differing from a worm gearing 31. The gearbox housing 28 may optionally be omitted as a result, and therefore the housing part 16 may be in the form of a pure electronic housing 25 or of a housing combined with the housing of the electric motor 12. The invention is preferably used in a commutator motor 12, in which the wound rotor is driven by means of permanent magnets arranged in the stator 36. The extent of the electronic components 38 on the printed circuit board 20 and the electric contact connection thereof may be formed differently. For example, the printed circuit board 20 may be designed merely as a relatively small sensor board, and may be formed with or without pulse width modulation (PWM). The structure, stability and shape of the housing cover 26, and also the arrangement of the housing openings 24 may be varied according to the requirements. The electric machine 10 is preferably used for actuators in the motor vehicle, for example for adjusting seat parts, vehicle windows, sliding roofs and coverings of openings, but is not restricted to such uses.

In a preferred configuration of the invention, the centering pin (44) penetrates the centering opening (45) without contact points, and therefore the press-in pins (49) and/or the soldering pins (48) can be fitted in a stress-free manner into the contact bores (50) and, in particular, can be soldered to the printed circuit board (20) in a stress-free manner.

The invention also comprises the combination that, first of all, the printed circuit board (20) is fixed in the housing part (16) by means of plastic deformation of a centering pin (44), and then the housing cover (26) is secured by means of the integral formation of a securing head (56) at a free end (46) of a centering pin (44). In this case, the plastic deformation for the fixing of the printed circuit board (20) and of the housing cover (26) can be undertaken at different centering pins (44) or at the same centering pin (44). In the last version, the plastic material deformation for fixing the printed circuit board (20)

is not undertaken at the free end (46) of the centering pin (44) but rather on a central region (54) on which a collar is preferably integrally formed.

The invention claimed is:

1. An electric machine (10), comprising a housing part (16) in which a printed circuit board (20) for electrically activating the electric machine (10) is arranged, wherein at least one centering pin (44) which reaches into a centering opening (45) in the printed circuit board (20) is arranged in the housing part (16), characterized in that the centering pin (44) is plastically deformed at a free end (46) thereof,
further characterized in that the centering pin (44) protrudes through a housing opening (24) in a housing cover (26), and the free end (46) of the centering pin (44) is plastically deformed on an outside of the housing cover (26), and
further characterized in that the plastically deformed free end (46) of the centering pin (44) has a larger diameter (53) than a diameter (23) of the housing opening (24) in the housing cover (26) and, with respect to a joining direction (8), forms a securing head (56) which prevents the housing cover (26) from being removed without being destroyed.

2. The electric machine (10) according to claim 1, characterized in that the at least one centering pin (44) is formed integrally with the housing part (16) as an extension of the housing part (16), and the plastic deformation of the free end (46) is deformed by supplying heat, wherein the housing part (16) is in the form of a plastics injection molded part.

3. The electric machine (10) according to claim 1, characterized in that the centering pin (44) extends transversely with respect to the printed circuit board (20) and on a side opposite the free end (46) has a step (43) against which the printed circuit board (20) bears in a fitted state.

4. The electric machine (10) according to claim 1, characterized in that the centering pin (44) preferably has a circular cross section, and, in a ready assembled state of the electric machine (10) after plastic deformation, the free end (46) of the centering pin (44) has a larger diameter (57) than a diameter (53) in an axially central region (54) of the centering pin (44).

5. The electric machine (10) according to claim 1, characterized in that the plastically deformed free end (46) of the centering pin (44) presses the printed circuit board (20) against a step (43) in the housing part (16) and fixedly fixes the printed circuit board (20) in relation to the housing part (16) in all three directions in space.

6. The electric machine (10) according to claim 1, characterized in that the plastically deformed free end (46) of the centering pin (44) has a larger diameter (53) than a diameter (58) of the centering opening (45) in the printed circuit board (20), and the deformed free end (46) bears directly against the printed circuit board (20) in a joining direction (8).

7. The electric machine (10) according to claim 1, characterized in that the printed circuit board (20) has electric contact bores (50) into which press-in pins (49) are pressed and/or soldering pins (48) are soldered.

8. The electric machine (10) according to claim 1, characterized in that the printed circuit board (20) extends approximately parallel to a rotor shaft (32) of the electric machine (10), and the at least one centering pin (44) is oriented approximately tangentially to the rotor shaft (32).

9. The electric machine (10) according to claim 1, characterized in that the housing cover (26) has latching elements (70) which, in a closed state, engage in a latching manner in mating latching elements (71) of the housing part (16).

10. The electric machine (10) according to claim 1, characterized in that the housing opening (24) is arranged within a depression (60) in the outer surface (65) of the housing cover (26), and the plastically deformed free end (46) of the centering pin (44) does not protrude outwards over the outer surface (65) of the housing cover (26).

11. The electric machine (10) according to claim 1, characterized in that the housing cover (26) presses the printed circuit board (20) in a joining direction (8) against a housing base (15).

12. The electric machine (10) according to claim 1, characterized in that precisely one or precisely two or precisely three centering pins (44) is or are integrally formed on the housing part (16).

13. A gearbox drive unit (14) with an electric machine (10) in the form of an electric motor (12) according to claim 1, and with a gearbox (30) arranged downstream with a gearbox housing (28) in which a rotor shaft (32) of the electric motor (12) drives a gearwheel (34), wherein the housing part (16) is in the form of an electronic housing (25).

14. An electric machine (10), comprising a housing part (16) in which a printed circuit board (20) for electrically activating the electric machine (10) is arranged, wherein at least one centering pin (44) which reaches into a centering opening (45) in the printed circuit board (20) is arranged in the housing part (16), characterized in that the centering pin (44) is plastically deformed at a free end (46) thereof,
further characterized in that the centering pin (44) protrudes through a housing opening (24) in a housing cover (26), and the free end (46) of the centering pin (44) is plastically deformed on an outside of the housing cover (26), and
further characterized in that the housing opening (24) is arranged within a depression (60) in an outer surface (65) of the housing cover (26), and the plastically deformed free end (46) of the centering pin (44) does not protrude outwards over the outer surface (65).

15. An electric machine (10), comprising a housing part (16) in which a printed circuit board (20) for electrically activating the electric machine (10) is arranged, the printed circuit board (20) having electric contact bores (50), wherein at least one centering pin (44) which reaches into a centering opening (45) in the printed circuit board (20) is arranged in the housing part (16), characterized in that the centering pin (44) is plastically deformed at a free end (46) thereof,
further characterized in that the centering pin (44) protrudes through a housing opening (24) in a housing cover (26), and the free end (46) of the centering pin (44) is plastically deformed on an outside of the housing cover (26), and
wherein press-in pins (49) which, with pushing the printed circuit board (20) onto the centering pins (44), are pressed into the corresponding electric contact bores (50) in a self-clamping manner.

* * * * *